United States Patent [19]
Khinkis et al.

[11] Patent Number: 5,350,293
[45] Date of Patent: Sep. 27, 1994

[54] METHOD FOR TWO-STAGE COMBUSTION UTILIZING FORCED INTERNAL RECIRCULATION

[75] Inventors: Mark J. Khinkis, Morton Grove; Abbasi, Hamid A., Darien; David F. Cygan, Villa Park, all of Ill.

[73] Assignee: Institute of Gas Technology, Chicago, Ill.

[21] Appl. No.: 94,940

[22] Filed: Jul. 20, 1993

[51] Int. Cl.⁵ ............................................. F23M 3/00
[52] U.S. Cl. ........................................ 431/116; 431/9
[58] Field of Search ........................... 431/115, 116, 9

[56] References Cited

U.S. PATENT DOCUMENTS

| | | |
|---|---|---|
| 964,031 | 7/1910 | Leahy ................................. 431/115 |
| 3,097,686 | 7/1963 | Morrow . |
| 3,540,821 | 11/1970 | Siegmund et al. .................. 431/116 |
| 3,760,776 | 9/1973 | Durrant . |
| 3,837,788 | 9/1974 | Craig et al. . |
| 4,004,875 | 1/1977 | Zink et al. . |
| 4,007,001 | 2/1977 | Schirmer et al. . |
| 4,021,188 | 5/1977 | Yamagishi et al. . |
| 4,395,223 | 7/1983 | Okigami et al. . |
| 4,445,842 | 5/1984 | Syska . |
| 4,575,332 | 3/1986 | Oppenberg et al. . |
| 4,629,413 | 12/1986 | Michelson et al. . |
| 4,656,972 | 4/1987 | Shimoda . |
| 4,659,305 | 4/1987 | Nelson et al. . |
| 4,699,071 | 10/1987 | Vier et al. . |
| 4,995,807 | 2/1991 | Rampley et al. ................... 431/115 |
| 5,044,932 | 9/1991 | Martin et al. . |
| 5,092,761 | 3/1992 | Dinicolantonio . |

*Primary Examiner*—Carroll B. Dority
*Attorney, Agent, or Firm*—Speckman, Pauley & Fejer

[57] ABSTRACT

A method for two-stage combustion in which a mixture of fuel and primary combustion air is burned in a primary combustion zone, the primary combustion air comprising less than a stoichiometric requirement for complete combustion of the fuel, a portion of cooled partial combustion products formed in the primary combustion zone is recirculated from a downstream end of the primary combustion zone to an upstream end of the primary combustion zone, secondary combustion air is introduced into a secondary combustion zone downstream of the primary combustion zone, a portion of the heat from the primary combustion zone is removed, cooling the partial combustion products formed therein, and the heat is transported away from the combustion process. An apparatus for two-stage combustion in accordance with this method is also disclosed.

21 Claims, 4 Drawing Sheets

METHOD FOR TWO-STAGE COMBUSTION UTILIZING FORCED INTERNAL RECIRCULATION

BACKGROUND OF THE INVENTION

1. Field of the Invention

This invention relates to a process and apparatus for two-stage combustion of fossil fuels, in particular, natural gas, which provides controllable combustion intensity, increased heat release, high combustion efficiency and low pollutant emissions. The process and apparatus of this invention are particularly suited to combustion chambers having a non-circular cross-section such as absorption chillers, process heaters, heat treating furnaces and other related equipment, as well as combustion chambers having a circular cross-section such as firetube boilers, indirect fired furnaces using radiant tubes and other related equipment.

2. Description of Prior Art

Conventional combustion of fossil fuels produces elevated temperatures which promote complex chemical reactions between oxygen and nitrogen, forming various oxides of nitrogen as by-products of the combustion process. These oxides, containing nitrogen in different oxidation states, generally are grouped together under the single designation of $NO_x$. Concern over the role of $NO_x$ and other combustion by-products, such as sulfur oxides ($SO_x$), carbon monoxide (CO), total hydrocarbons (THC) and carbon dioxide ($CO_2$), in "acid rain" and other environmental problems is generating considerable interest in reducing the formation of these environmentally harmful by-products of combustion.

Natural gas is a low emission, high efficiency fuel which can help reduce these emissions. As a result, numerous ultra-low emission, natural gas-fired combustion systems are under development.

Known methods of combustion for reducing $NO_x$ emissions from combustion processes include flue gas recirculation and staged combustion. U.S. Pat. No. 4,004,875 teaches a low $NO_x$ burner for combustion of liquid and gaseous fuels in which the combustion area is divided into at least two stages and combustion products are recirculated, cooled and reintroduced into the primary combustion zone, resulting in a reduction of $NO_x$ emissions. The secondary combustion air is introduced into a secondary combustion zone downstream of the primary combustion zone in an amount sufficient to complete combustion therein. Fuel and primary combustion air are introduced into a primary combustion zone formed by a burner tile which provides a high temperature environment for the fuel and air mixture to promote combustion. Except for the opening into the secondary combustion zone, the tile is completely surrounded by a steel enclosure forming an annular space around the tile. Thus, as fuel and air are injected into the primary combustion zone, part of the partially combusted fuel and air is recirculated around the outside of the tile in the annular space between the tile and the steel enclosure and back into the upstream end of the primary combustion zone. It is known that, in addition to limiting the oxygen available in a combustion process for formation of $NO_x$ emissions, $NO_x$ emissions may also be controlled by maintaining the temperature in the combustion zone below the temperature required for formation of significant $NO_x$, about 2600° F. Although the '875 patent teaches recirculation of cooled partial combustion products from the downstream end of the primary combustion zone to the upstream end of the primary combustion zone, any heat removed from the primary combustion zone as a result of cooling and recirculating the partial combustion products is reintroduced into the secondary combustion zone, resulting in no net heat removal from the combustion process. Thus, while the burner taught by the '875 patent contains certain requisites for reducing $NO_x$ emissions, most notably flue gas recirculation and staged combustion, provisions for maintaining the temperatures in the primary and secondary combustion zones below the temperature required for formation of $NO_x$ in the combustion process are absent.

U.S. Pat. No. 4,629,413 teaches a low $NO_x$ burner utilizing staged combustion in which a mixture of primary combustion air and fuel are introduced into a primary combustion chamber and secondary combustion air is introduced into the combustion chamber in a manner such that the mixing of the secondary combustion air with the flame generated by the mixture of fuel and primary combustion air is delayed. To further inhibit the formation of $NO_x$ emissions, cooled flue gases are recirculated within the combustion chamber into the fuel-rich combustion zone at the base of the flame, that is, the upstream end of the primary combustion zone.

U.S. Pat. No. 5,044,932 also teaches a process and apparatus for reducing the $NO_x$ content of flue gas effluent from a furnace in which cooled flue gases are internally recirculated from the downstream end of the combustion chamber into the upstream end of the combustion chamber where it undergoes reaction with the flame generated by the fuel and air introduced into the upstream end of the combustion chamber. Flue gas recirculation for mixing with primary combustion air and fuel prior to initiation of combustion is taught by U.S. Pat. No. 5,092,761. Finally, U.S. Pat. Nos. 3,097,686, 4,445,842, 3,760,776, 4,699,071, 4,659,305, and 4,656,972 generally teach the concept of flue gas recirculation from the exhaust stack of a furnace system back to the burner by means external to the combustion chamber.

A combustion process producing low $NO_x$ emissions utilizing staged combustion is taught by U.S. Pat. No. 4,007,001 in which 0–65% of the total air required for combustion is introduced into a primary combustion zone and 5–25% of the total air required for combustion is provided to a secondary combustion zone. Both U.S. Pat. Nos. 4,021,188 and 3,837,788 teach staged combustion with less than a stoichiometric amount of air in the primary combustion chamber with additional air being added to the secondary combustion chamber for completion of combustion.

U.S. Pat. No. 4,575,332 teaches staged combustion in a swirl combustor with forced annular recycle of flue gases to the upstream end of the primary combustion zone, and U.S. Pat. No. 4,395,223 teaches staged combustion with excess air introduced into the primary combustion zone with additional fuel being introduced into the secondary combustion zone.

As previously stated, temperature in the primary and secondary combustion zones of a combustion chamber is a critical parameter by which $NO_x$ emissions from a combustion process can be controlled. By providing less than the stoichiometric requirement of combustion air to the primary combustion zone as taught by the prior art, temperatures within the primary combustion zone are substantially below the temperatures of a primary combustion zone into which a stoichiometric, or more than a stoichiometric, requirement of air is introduced. However, the heat generated in the primary combustion zone in accordance with known combustion processes is conveyed into the secondary combustion zone into which secondary combustion air required for completing combustion of the fuel is introduced. Thus, the net heat within the combustion chamber remains unchanged.

SUMMARY OF THE INVENTION

Accordingly, it is an object of this invention to provide a combustion process which produces low pollutant emissions, in particular, low $NO_x$, carbon monoxide, and total hydrocarbons in the exhaust gases.

It is another object of this invention to provide a combustion process utilizing air staging in which combustion is carried out in two stages.

It is yet another object of this invention to provide a process and apparatus for staged combustion in which net heat produced by the combustion process is reduced by removal of heat from the combustion process in the first stage of the process.

These and other objects of this invention are achieved by a method for two-stage combustion in accordance with one embodiment of this invention in which a mixture of fuel and primary combustion air are burned in a primary combustion zone, the primary combustion air comprising less than a stoichiometric requirement for complete combustion of the fuel, thereby forming incomplete products of combustion or partial combustion products. In accordance with one embodiment of this invention, the fuel and primary combustion air are premixed before being introduced into the primary combustion zone. In accordance with another embodiment of this invention, the fuel and primary combustion air are introduced separately into the primary combustion zone in which the fuel and primary combustion air form a mixture for burning. To maintain the temperature in the primary and secondary combustion zones below the temperature required for formation of significant amounts of $NO_x$, a portion of the heat generated in the primary combustion zone is removed from the primary combustion zone resulting in cooling of the partial combustion products. A portion of the cooled partial combustion products is recirculated from a downstream end of the primary combustion zone to the upstream end of the primary combustion zone. Secondary combustion air, preferably in an amount less than the amount of primary combustion air, is introduced into the secondary combustion zone downstream of the primary combustion zone, thereby completing combustion of the partial combustion products. To further maintain temperatures within the secondary combustion zone below the level required for formation of significant amounts of $NO_x$, a portion of the heat therein is removed.

A critical feature of the process of this invention is the removal of heat from the combustion zone in order to control temperatures within the primary and secondary combustion zones. It is also a critical feature of this invention that the heat removed from the primary combustion zone is not reintroduced into the combustion process.

In accordance with one embodiment of this invention, a diluent selected from the group consisting of recirculated flue gases, steam, water, nitrogen and mixtures thereof is introduced into the primary combustion zone, either separately or mixed with the primary combustion air, as shown in FIG. 1, to further reduce temperatures within the primary and secondary combustion zones. In accordance with yet another embodiment, said diluent is introduced into said secondary combustion zone, either separately or mixed with secondary combustion air as shown in FIG. 1. In accordance with still another embodiment of this invention, said diluent is introduced into both the primary and secondary combustion zones.

An apparatus for two-stage combustion in accordance with this invention comprises a combustion chamber side wall connected to a combustion chamber end wall which combustion chamber walls enclose a combustion chamber. The combustion chamber comprises a primary combustion zone and a secondary combustion zone, the secondary combustion zone being disposed downstream of the primary combustion zone. The apparatus further comprises means for introducing a mixture of fuel and primary combustion air into the primary combustion zone; means for removing heat from the primary combustion zone; recirculation means for recirculating a portion of the cooled partial combustion products generated in the primary combustion zone from a downstream end of the primary combustion zone to an upstream end of the primary combustion zone; means for introducing secondary combustion air into the secondary combustion zone; and means for removing a portion of the heat from the secondary combustion zone. With respect to the removal of heat from the primary combustion zone, it is a critical feature of the apparatus that a substantial portion of the heat so removed is not reintroduced into the combustion process within the apparatus.

The apparatus for two-stage combustion in accordance with one embodiment of this invention further comprises means for introducing a diluent into at least one of said primary combustion zone and said secondary combustion zone.

The apparatus for two-stage combustion in accordance with this invention is particularly suitable for use in absorption chillers, process heaters, water heaters, watertube boilers and firetube boilers. A firetube boiler in accordance with one embodiment of this invention comprises a boiler wall having an opening, a firetube on the interior of the boiler secured to the boiler wall around the periphery of the opening, means for introducing a mixture of fuel and primary combustion air into a primary combustion zone formed by the firetube, means for introducing secondary combustion air into a secondary combustion zone formed by the firetube downstream of the primary combustion zone, means for removing heat from the primary combustion zone and cooling partial combustion products in the primary combustion zone, recirculation means for recirculating a portion of the cooled partial combustion products from a downstream end of the primary combustion zone to an upstream end of the primary combustion zone disposed within the firetube, and means for removing heat from the secondary combustion zone.

BRIEF DESCRIPTION OF DRAWINGS

These and other features of this invention will be better understood from the following detailed description taken in conjunction with the drawings, wherein.

DESCRIPTION OF PREFERRED EMBODIMENTS

Figure 1:
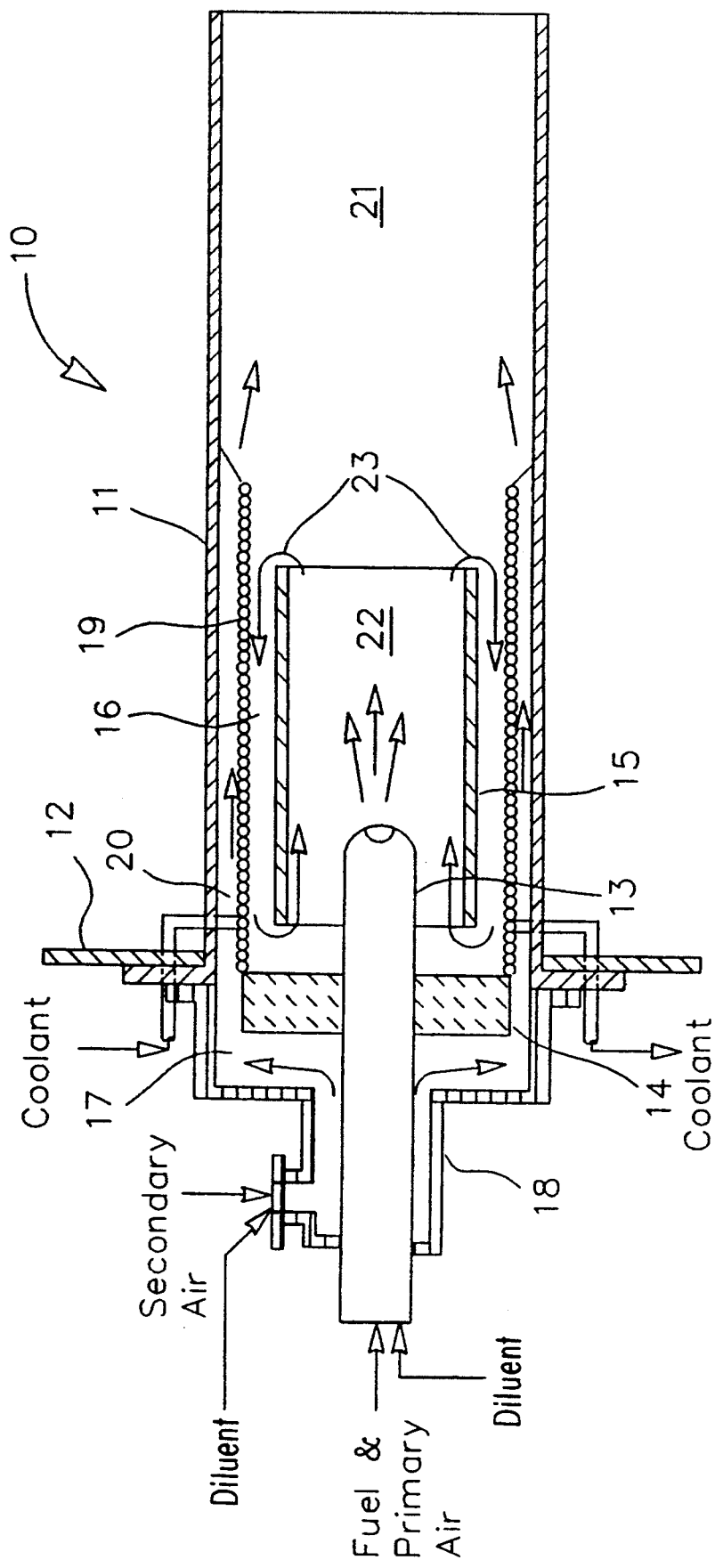
FIG. 1 is a partial cross-sectional side view of a two-stage combustion apparatus in accordance with one embodiment of this invention.

The method for two-stage combustion in accordance with one embodiment of this invention comprises the steps of introducing a fuel, preferably natural gas, and primary combustion air into the primary combustion zone of a combustion chamber and burning the mixture therein. It will be apparent to those skilled in the art that air, oxygen and oxygen-enriched air are suitable for use in combustion of a fuel. Accordingly, as used in the specification and claims, the term "combustion air" means air, oxygen or oxygen-enriched air. The amount of primary combustion air provided for combustion of the fuel comprises less than the stoichiometric requirement for complete combustion of the fuel, preferably between about 0.7 and 0.99, resulting in incomplete combustion of the fuel in the primary combustion zone and the formation of partial combustion products. In accordance with one embodiment of the method of this invention, the stoichiometric ratio in the primary combustion zone is reduced below 0.7 by at least partial catalytic combustion of the mixture of fuel and primary combustion air in the primary combustion zone. As the stoichiometric ratio in the primary combustion zone is reduced, it is known that stabilization of the flame resulting from combustion of said mixture becomes a problem. By utilizing catalytic combustion of at least a portion of the mixture, stabilization of the flame within the primary combustion zone can be greatly enhanced. In addition, application of catalytic combustion within the secondary combustion zone further stabilizes and enhances combustion. It will be apparent to those skilled in the art that other means for stabilizing the flame within the primary combustion zone are also available. To complete combustion of the fuel, secondary combustion air is introduced into a secondary combustion zone downstream of the primary combustion zone, the amount of secondary air introduced into the secondary combustion zone preferably being less than the amount of primary combustion air in the primary combustion zone.

An essential step in the method for two-stage combustion in accordance with one embodiment of this invention is the removal of a portion of the heat generated by the combustion of fuel and primary combustion air from the primary combustion zone in a manner such that a substantial portion of the heat thus removed is not reintroduced into a later stage of the combustion process. The amount of heat removed from the primary combustion zone is between about 10% and about 50% of the total heat input to the apparatus and preferably between about 15% to about 30% of the total heat input. As a result of removal of a portion of the heat from the primary combustion zone, the partial combustion products therein are cooled. A portion of the cooled partial combustion products are recirculated from a downstream end of the primary combustion zone to an upstream end of the primary combustion zone. The effect of removing heat from the primary combustion zone and recirculating cooled partial combustion products from the downstream end of the primary combustion zone to the upstream end of the primary combustion zone is to reduce the temperature within the primary and secondary combustion zones below the temperature required for significant formation of $NO_x$, approximately 2600° F., and reduce the relative concentration of oxygen and nitrogen in the primary combustion zone, further inhibiting the formation of $NO_x$ therein. To further maintain the temperature in the secondary combustion zone below the temperature required for formation of $NO_x$, a portion of the heat therein may also be removed.

FIG. 1 shows an exemplary apparatus for two-stage combustion in accordance with the method of this invention. Combustor 10 comprises firetube 11 secured to boiler wall 12. Combustion chamber side wall 19 is disposed inside firetube 11 and parallel to the walls of firetube 11. Combustion chamber side wall 19 is connected at one end to end wall 14, combustion chamber side wall 19 and end wall 14 enclosing a combustion chamber. Combustion chamber side wall 19 is disposed at a distance from firetube 11 forming secondary air annulus 20 between combustion chamber side wall 19 and firetube 11. Combustion chamber side wall 19 extends in a longitudinal direction into firetube 11 sufficiently to enable secondary combustion air to be introduced through secondary air annulus 20 into secondary combustion zone 21 disposed downstream of primary combustion zone 22. Sealing off the open end of firetube 11 connected to boiler wall 12 is plenum chamber wall 18 disposed at a distance from end wall 14 and forming secondary air plenum 17 between end wall 14 and plenum chamber wall 18. Secondary air plenum 17 is in communication with secondary air annulus 20. To provide a mixture of fuel and primary combustion air into primary combustion zone 22, combustor 10 comprises fuel and primary air nozzle 13 which extends axially through plenum chamber wall 18 and end wall 14 into primary combustion zone 22.

To recirculate a portion of the partial combustion products in primary combustion zone 22 from the downstream end of primary combustion zone 22 to the upstream end of primary combustion zone 22 as denoted by arrows 23, combustor 10 further comprises recirculation wall 15, preferably in the shape of a hollow cylinder, disposed in primary combustion zone 22 parallel to and at a distance from combustion chamber side wall 19, thereby forming recirculation annulus 16 between combustion chamber side wall 19 and recirculation wall 15. As a result of negative pressure generated at the upstream end of primary combustion zone 22 by the kinetic energy provided by the introduction of the fuel/air mixture through fuel and primary air nozzle 13, a portion of the partial combustion products exiting the downstream end of primary combustion zone 22 are recirculated through recirculation annulus 16 and reintroduced through the upstream end of primary combustion zone 22 into primary combustion zone 22.

To remove heat from the primary combustion zone and, thus, cool the partial combustion products, firetube 11 is surrounded by a cooling medium such as water which is heated by heat flowing from the interior of primary combustion zone 22 through firetube wall 11.

Figure 2:
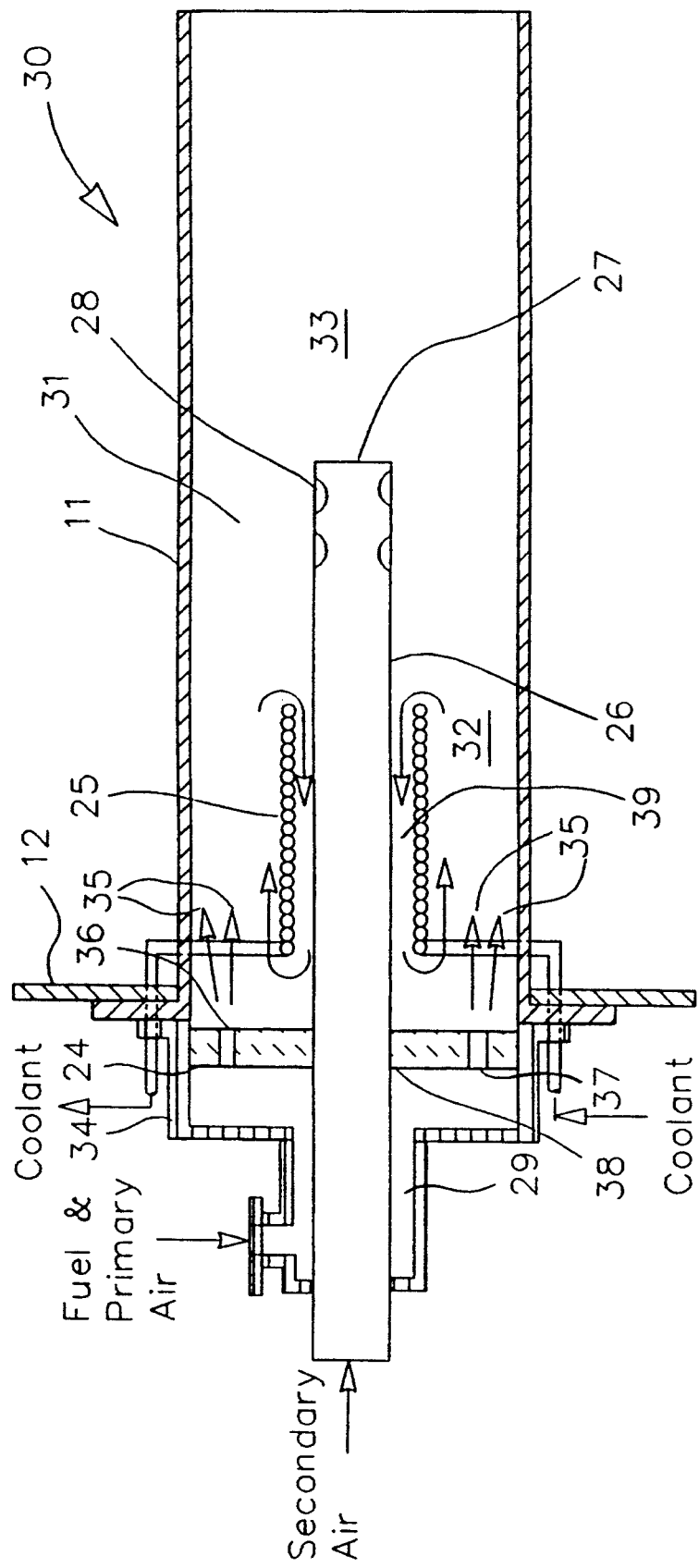
FIG. 2 is a partial cross-sectional side view of a two-stage combustion apparatus in accordance with another embodiment of this invention.

FIG. 2 shows an apparatus for staged combustion in accordance with another embodiment of this invention. In accordance with this embodiment, combustor 30 comprises firetube 11 secured to boiler wall 12 and closed off proximate boiler wall 12 by end wall 24, firetube 11 and end wall 24 forming combustion chamber 31 comprising primary combustion zone 32 proximate end wall 24 and secondary combustion zone 33 disposed downstream of primary combustion zone 32. Combustor 30 further comprises means for introducing a mixture of fuel and primary combustion air into primary combustion zone 32 in the form of plenum wall 34 secured to end wall 24 and forming plenum 29 upstream of end wall 24. End wall 24 forms a centrally disposed opening 38 through which secondary air nozzle 26 extends into secondary combustion zone 33. Nozzle tip 27 of secondary air nozzle 26 forms openings 28 through which secondary combustion air is introduced into secondary combustion zone 33. It will be apparent to those skilled in the art that although openings 28 are shown as being radially disposed, thereby resulting in radial injection of said secondary combustion air, said secondary combustion air may be tangentially or axially introduced into said secondary combustion zone through suitably disposed openings in nozzle tip 27.

It will also be apparent to those skilled in the art that although the apparatus shown in FIG. 2 is for a firetube boiler, other embodiments, such as for fluid heaters, process heaters, watertube boilers and the like, are possible where the combustion chamber side wall is in a form other than a firetube.

End wall 24 further forms openings 36, 37 at a distance from centrally disposed opening 38 through which fuel and primary combustion air in plenum 29 pass into primary combustion zone 32 as denoted by arrows 35.

As shown in FIG. 2, combustor 30 further comprises recirculation wall 25 disposed in primary combustion zone 32 at a distance from end wall 24 and surrounding secondary air nozzle 26 at a distance from secondary air nozzle 26, forming annulus 39 between recirculation wall 25 and secondary air nozzle 26. As in the embodiment of the apparatus of this invention shown in FIG. 1, heat is removed from the primary combustion zone by a heat transfer medium disposed around the exterior of firetube 11 in heat exchange contact therewith.

The apparatus for staged combustion in accordance with another embodiment of this invention comprises means for stabilizing the flame resulting from combustion of the fuel and primary combustion air in the primary combustion zone. Such flame stabilization means permit operation of the apparatus at stoichiometric ratios in the primary combustion zone as low as 0.5. Such stabilization means also enable the use of higher jet velocities through, for example, openings 36, 37 thereby increasing recirculation of cooled partial combustion products from the downstream end to the upstream end of the primary combustion zone and further reducing $NO_x$.

In accordance with one embodiment of this invention, said flame stabilization means comprise a combustion catalyst disposed within said apparatus, for example, applied to the inner surfaces of openings 36, 37 through end wall 24. It will be apparent to those skilled in the art that the combustion catalyst may be initially disposed at numerous locations within the apparatus.

Figure 3:
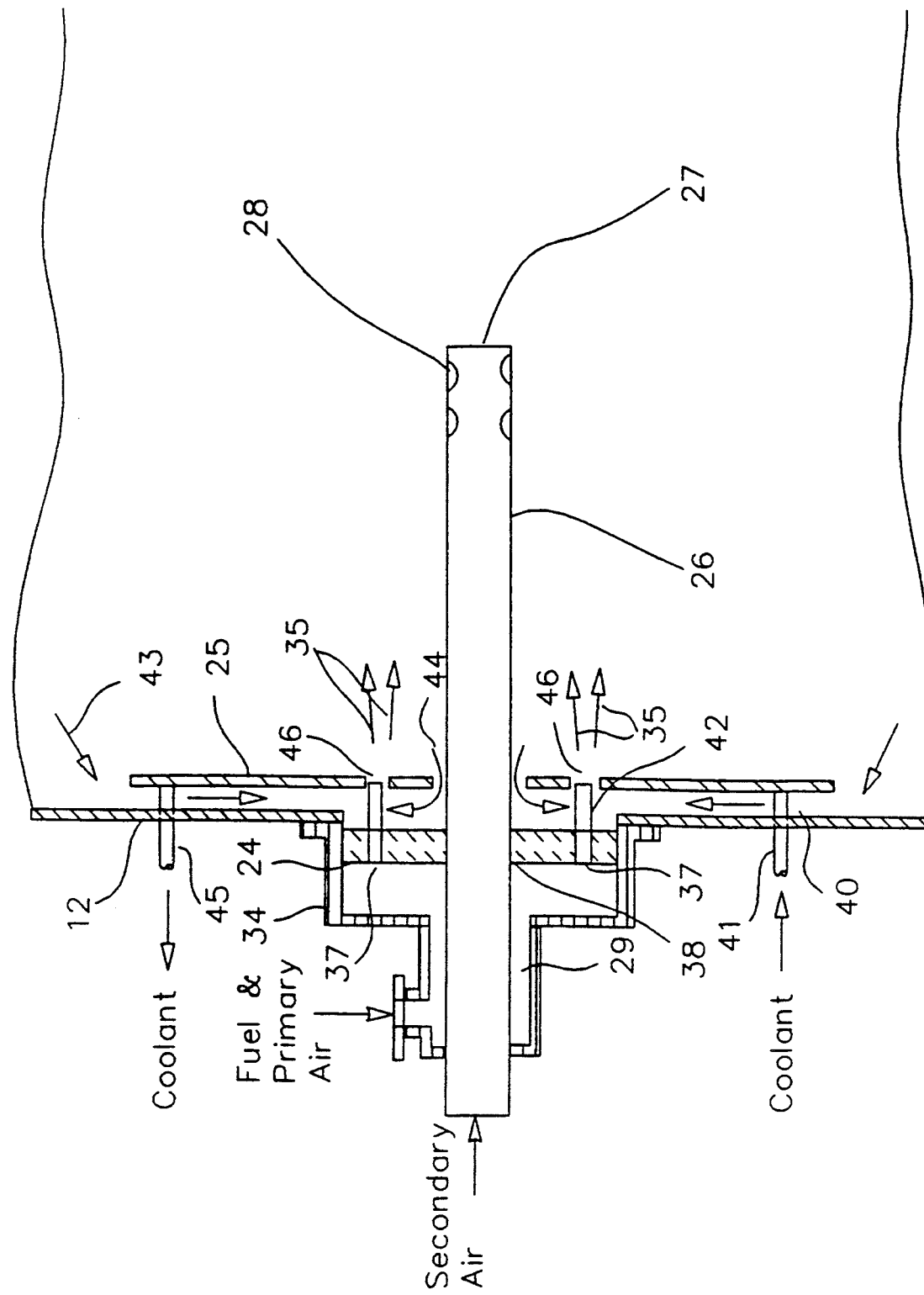
FIG. 3 is a partial cross-sectional side view of a two-stage combustion apparatus in accordance with another embodiment of this invention.

FIG. 3 shows yet another embodiment of the apparatus of this invention. In accordance with this embodiment of the invention, recirculation wall 25 is generally parallel to and at a distance from end wall 24 and surrounds nozzle 26. As a result, partial combustion products are recirculated from the downstream end of the primary combustion zone through the annulus disposed between nozzle 26 and recirculation wall 25 as indicated by arrow 44 as well as the space 40 disposed between recirculation wall 25 and end wall 24/furnace wall 12 as indicated by arrow 43. To enable the mixture of fuel and primary combustion air to flow from plenum 29 into the primary combustion zone, recirculation wall 25 forms openings 46. Thus, the mixture flows from plenum 29 through openings 37 and nozzles 42 disposed therein through openings 46 and into the primary combustion zone.

Figure 4:
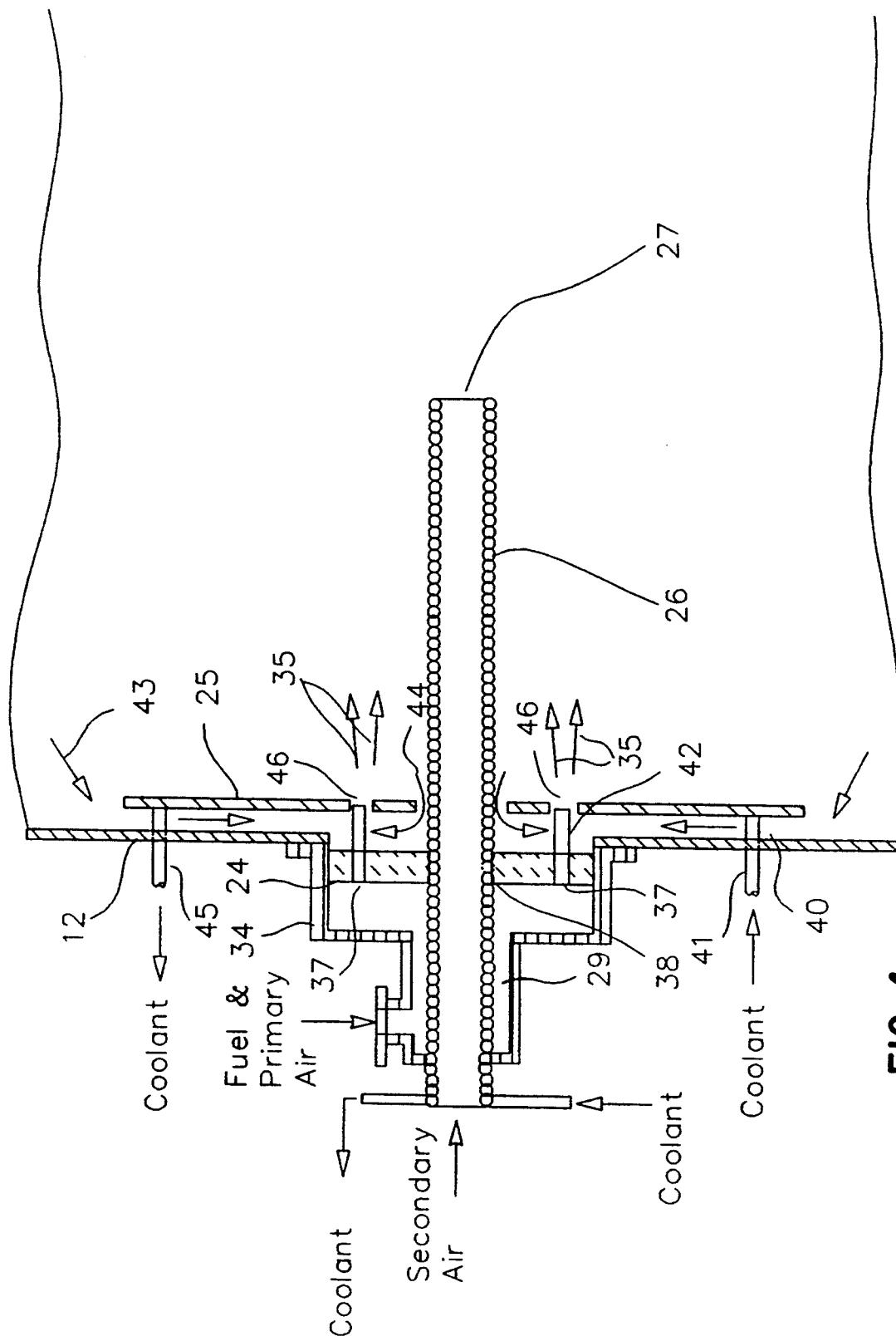
FIG. 4 is a partial cross-sectional side view of a two-stage combustion apparatus in accordance with yet another embodiment of this invention.

In accordance with yet another embodiment of this invention, recirculation wall 25 is cooled preferably by a coolant circulated through recirculation wall 25 by way of coolant inlet 41 and coolant outlet 45. The preferred coolant in accordance with this embodiment of the invention is water. In accordance with another embodiment of this invention as shown in FIG. 2, recirculation wall 25 is in the form of a cooling coil through which a coolant can be circulated. In accordance with yet another embodiment of this invention as shown in FIG. 1, combustion chamber side wall 19 is in the form of a cooling coil through which a coolant is circulated. In accordance with still another embodiment of this invention as shown in FIG. 4, secondary air nozzle 26 is in the form of a cooling coil through which a coolant is circulated. In each embodiment employing coolant circulation through cooling coils, said coolant can be used for removing heat from the primary combustion zone.

The following table shows the results of operation of the process and apparatus of this invention with respect to emissions generated:

TABLE

|  | Test #1 | Test #2 |
| --- | --- | --- |
| Firing Rate, Btu/hr | $4 \times 10^6$ | $6 \times 10^6$ |
| Primary Air Flow, SCF/hr | 28,200 | 42,600 |
| Secondary Air Flow, SCF/hr | 16,400 | 26,110 |
| Excess Air, % | 12.1 | 16.4 |
| Stoichiometric Ratio - Primary Combustion Zone | 0.74 | 0.75 |
| Total Heat Removal from Primary Combustion zone, % | 13.8 | 13.5 |
| $NO_x$, vppm at 3% $O_2$ | 12.6 | 18.1 |
| CO, vppm at 3% $O_2$ | 72.0 | 11.2 |
| $O_2$, % | 2.5 | 3.2 |

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for two-stage combustion comprising the steps of:
 burning a mixture of fuel and primary combustion air in a primary combustion zone, said primary combustion air comprising less than a stoichiometric requirement for complete combustion of said fuel, forming partial combustion products;

removing a first portion of heat from said primary combustion zone, cooling said partial combustion products;

recirculating a portion of said cooled partial combustion products from a downstream end of said primary combustion zone to an upstream end of said primary combustion zone;

introducing secondary combustion air into a secondary combustion zone downstream of said primary combustion zone, completing combustion of said partial combustion products; and removing a second portion of heat from said secondary combustion zone.

2. A method in accordance with claim 1, wherein said fuel is natural gas.

3. A method in accordance with claim 1, wherein the amount of said secondary combustion air is less than the amount of said primary combustion air.

4. A method in accordance with claim 1, wherein a diluent selected from the group consisting of recirculated flue gases, steam, water, nitrogen and mixtures thereof is introduced into at least one of said primary combustion zone and said secondary combustion zone.

5. A method in accordance with claim 1, wherein at least a portion of said mixture of fuel and primary combustion air is catalytically combusted in said primary combustion zone.

6. In a process for two-stage combustion in which a mixture of fuel and primary combustion air is burned in a primary combustion zone, said primary combustion air comprising less than a stoichiometric requirement for complete combustion of said fuel, a portion of cooled partial combustion products formed in said primary combustion zone is recirculated from a downstream end of said primary combustion zone to an upstream end of said primary combustion zone, and secondary combustion air is introduced into a secondary combustion zone downstream of said primary combustion zone, the improvement comprising:

removing a portion of heat from said primary combustion zone, cooling said partial combustion products; and transporting said heat away from said combustion process.

7. A process in accordance with claim 6, wherein said fuel is natural gas.

8. A process in accordance with claim 6, wherein the amount of said secondary combustion air is less than the amount of said primary combustion air.

9. A process in accordance with claim 6, wherein a diluent selected from the group consisting of recirculated flue gases, steam, water, nitrogen and mixtures thereof is introduced into at least one of said primary combustion zone and said secondary combustion zone.

10. A process in accordance with claim 6, wherein at least a portion of said mixture of fuel and primary combustion air is catalytically combusted in said primary combustion zone.

11. An apparatus for two-stage combustion comprising:

a combustion chamber side wall connected to a combustion chamber end wall, said combustion chamber walls enclosing a combustion chamber, said combustion chamber having a primary combustion zone and a secondary combustion zone, said secondary combustion zone disposed downstream of said primary combustion zone;

means for introducing a fuel and primary combustion air into said primary combustion zone;

means for removing a first portion of heat from said primary combustion zone;

recirculation means for recirculating a portion of partial combustion products from a downstream end of said primary combustion zone to an upstream end of said primary combustion zone;

means for introducing secondary combustion air into said secondary combustion zone; and means for removing a second portion of heat from said secondary combustion zone.

12. An apparatus in accordance with claim 11, wherein said means for introducing said fuel and said primary combustion air into said primary combustion zone comprise means for introducing a mixture of said fuel and said primary combustion air into said primary combustion zone.

13. An apparatus in accordance with claim 11, wherein said means for introducing said secondary combustion air into said secondary combustion zone comprises a nozzle extending through said combustion chamber end wall and into said secondary combustion zone, said combustion chamber end wall disposed at an upstream end of said primary combustion zone.

14. An apparatus in accordance with claim 13, wherein said recirculation means comprises said nozzle and a recirculation wall disposed in said primary combustion zone at a distance from said combustion chamber end wall and said combustion chamber side wall and surrounding said nozzle at a distance from said nozzle, forming an annulus between said recirculation wall and said nozzle.

15. An apparatus in accordance with claim 11, wherein said recirculation means comprises a recirculation wall disposed in said primary combustion zone at a distance from said combustion chamber side wall and said combustion chamber end wall, forming an annulus between said recirculation wall and said combustion chamber side wall.

16. An apparatus in accordance with claim 15, wherein said means for introducing said fuel and primary combustion air into said primary combustion zone comprises a nozzle secured to said combustion chamber end wall and extending through said combustion chamber end wall into said primary combustion zone.

17. An apparatus in accordance with claim 14 further comprising means for cooling said recirculation wall.

18. An apparatus in accordance with claim 15 further comprising means for cooling said recirculation wall.

19. An apparatus in accordance with claim 17, wherein said means for cooling said recirculation wall comprises means for circulating a coolant within at least a portion of said recirculation wall.

20. An apparatus in accordance with claim 11 further comprising means for stabilizing a flame in said primary combustion zone.

21. An apparatus in accordance with claim 20, wherein said means for stabilizing a flame in said primary combustion zone comprises a combustion catalyst disposed within said primary combustion zone.

* * * * *